Figure 1:
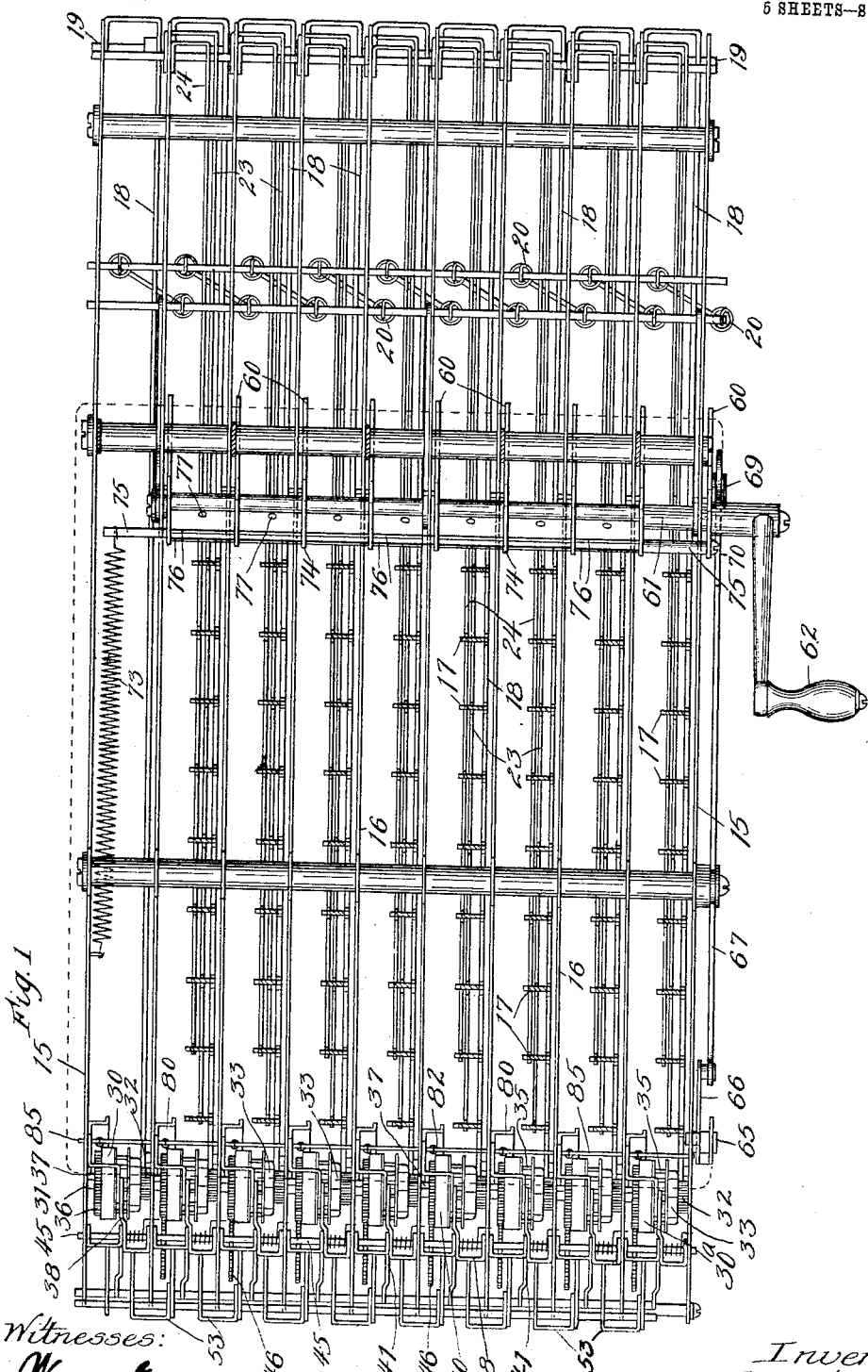

No. 767,107. PATENTED AUG. 9, 1904.
D. E. FELT.
CANCELING MECHANISM FOR CALCULATORS.
APPLICATION FILED AUG. 3, 1903.
NO MODEL. 5 SHEETS—SHEET 1.

Witnesses:
Wm. Geiger
H. W. Munday

Inventor:
Dorr E. Felt
By Munday, Evarts & Adcock.
Attorneys

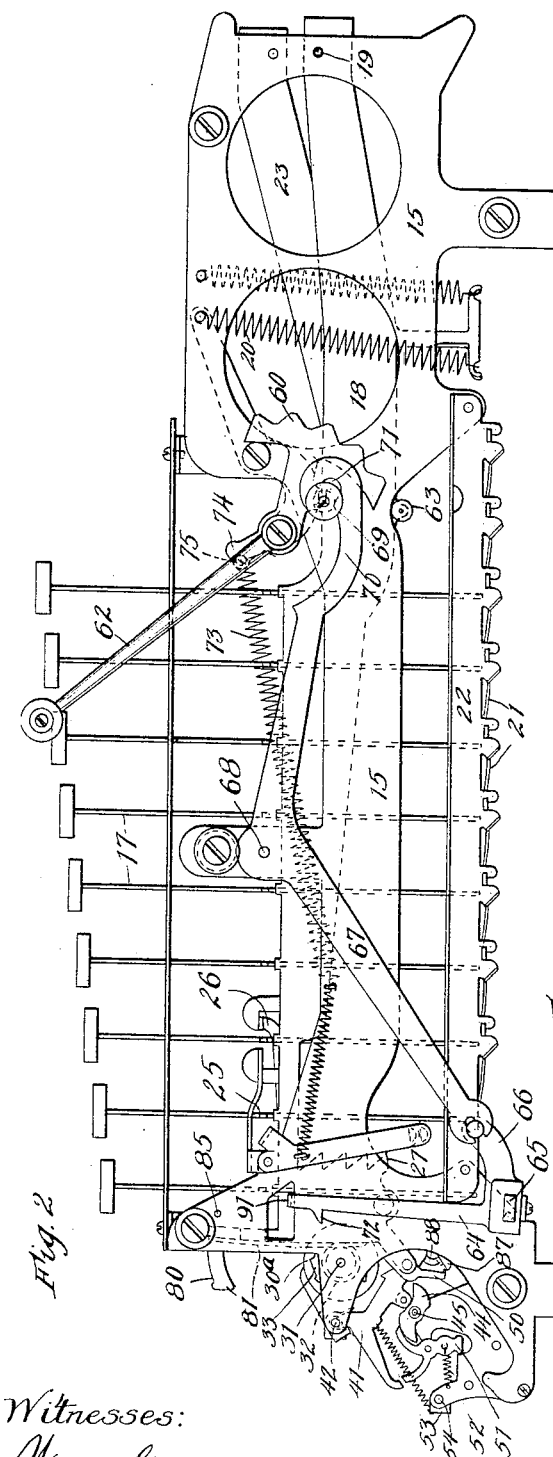

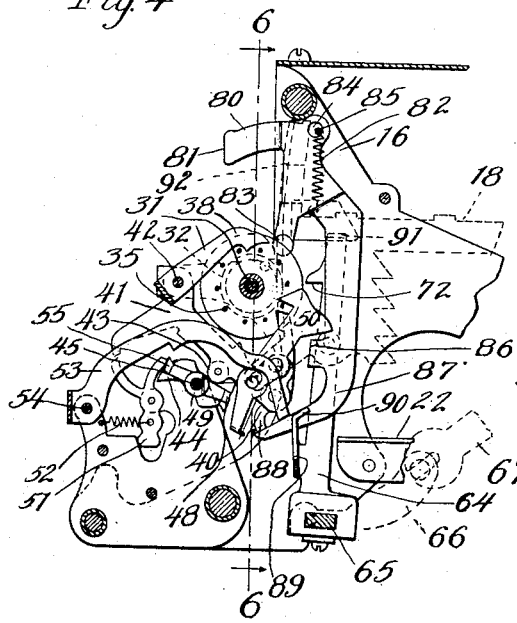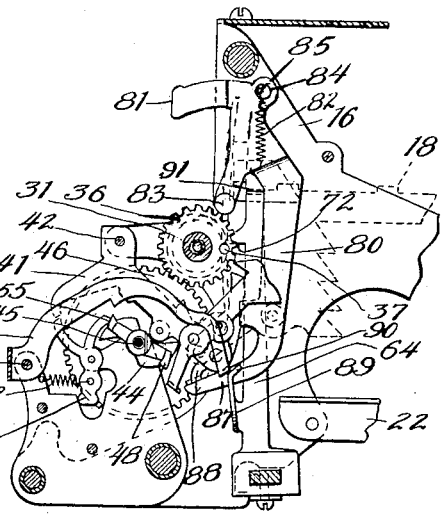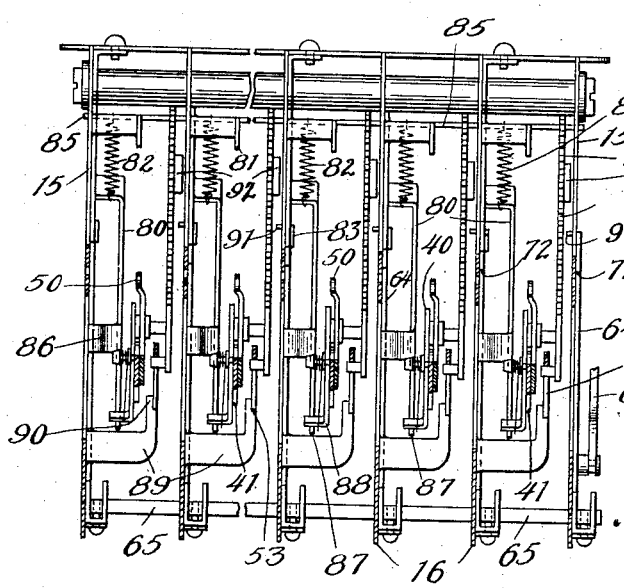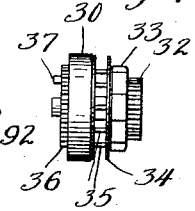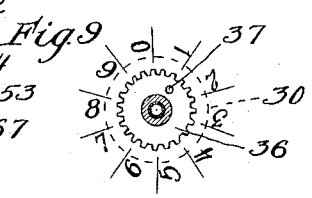

No. 767,107. PATENTED AUG. 9, 1904.
D. E. FELT.
CANCELING MECHANISM FOR CALCULATORS.
APPLICATION FILED AUG. 3, 1903.
NO MODEL. 5 SHEETS—SHEET 4.

Witnesses:
Wm. Geiger
H. W. Munday

Inventor:
Dorr E. Felt
By Munday, Evarts & Adcock
Attorneys

No. 767,107. PATENTED AUG. 9, 1904.
D. E. FELT.
CANCELING MECHANISM FOR CALCULATORS.
APPLICATION FILED AUG. 3, 1903.
NO MODEL. 5 SHEETS—SHEET 5.
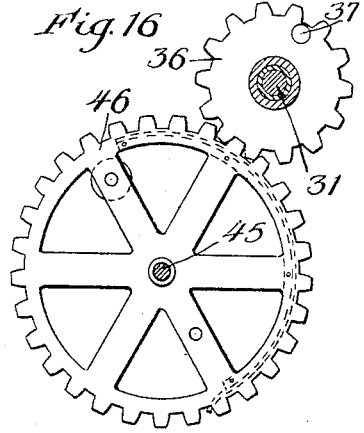
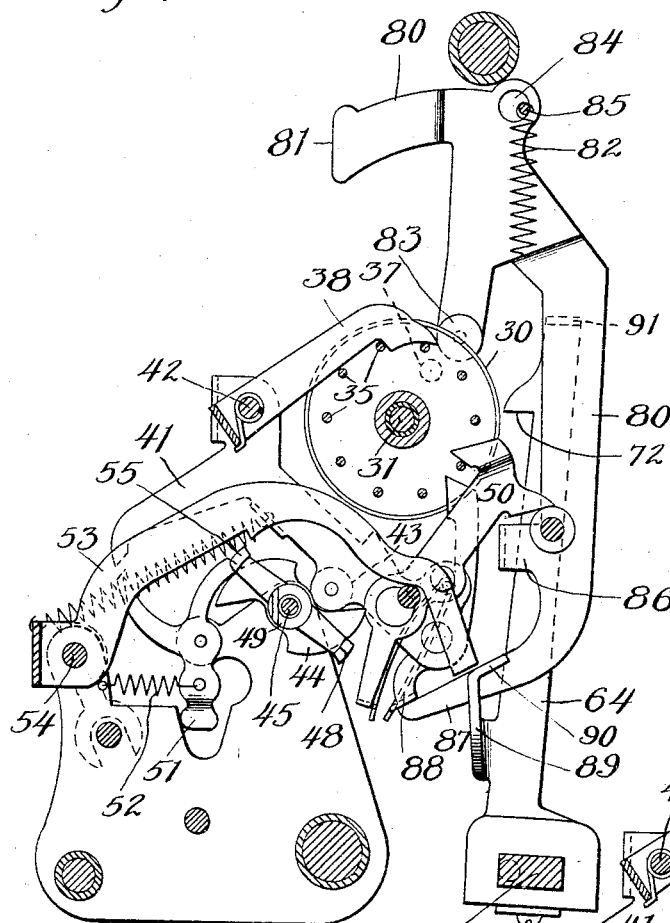
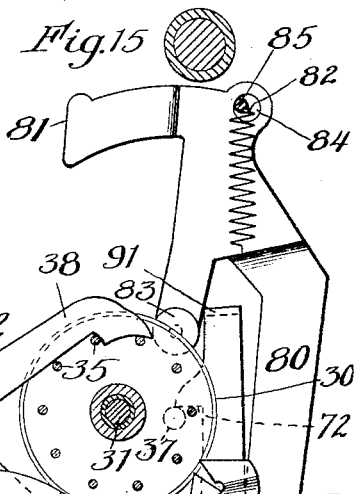
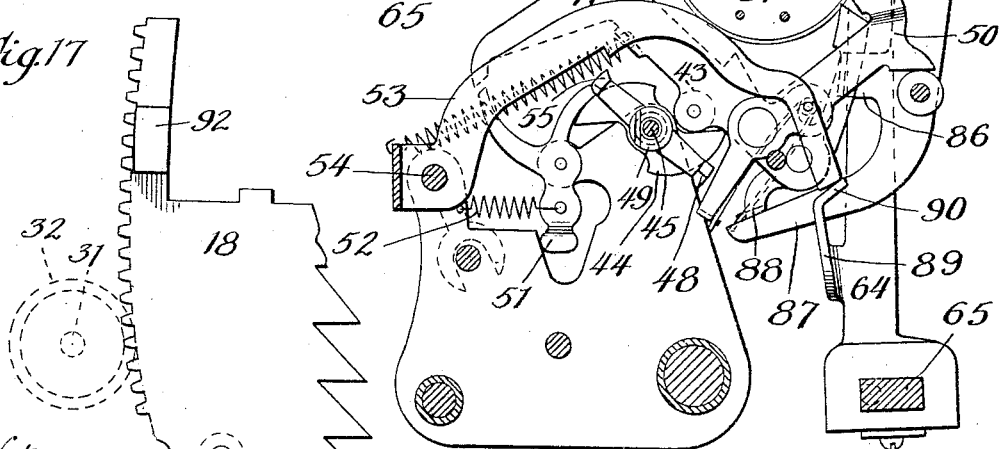
Witnesses:
Wm. Geiger
H. W. Munday
Inventor:
Dorr E. Felt
By Munday, Evarts & Adcock,
Attorneys No. 767,107.                                                                                    Patented August 9, 1904.

UNITED STATES PATENT OFFICE.

DORR E. FELT, OF CHICAGO, ILLINOIS.

CANCELING MECHANISM FOR CALCULATORS.

SPECIFICATION forming part of Letters Patent No. 767,107, dated August 9, 1904.

Application filed August 3, 1903. Serial No. 167,957. (No model.)

*To all whom it may concern:*

Be it known that I, DORR E. FELT, a citizen of the United States, residing in Chicago, in the county of Cook and State of Illinois, have invented a new and useful Improvement in Canceling Mechanism for Calculators, of which the following is a specification.

This invention relates to the canceling mechanism of calculating-machines, and has been devised with special reference to its use in the calculating-machine shown in my application Serial No. 163,488, filed June 29, 1903.

The machine of my application embodies a series of denominational numeral-wheels arranged side by side on a common shaft, a series of denominational segment-levers operated in one direction by the keys and in the opposite direction by springs and adapted to actuate the wheels in accordance with the power of the keys which are struck.

The machine also embodies a separate carrying mechanism for each wheel having its own motor-spring, in which power is stored for its actuation in the carrying operation.

In the present invention I aim preparatory to the canceling operation or as a part thereof to bring the units-wheel to the "9" position and all the other wheels to the "8" position and to lock the wheels in those positions with the segment-levers depressed, so that when the wheels are released the return strokes of the levers will actuate all of the wheels through a single space, or, in other words, add one number to each wheel. With the wheels in the position stated it will be seen that the units-wheel will be thus turned to the "0" position and all the other wheels to the "9" position by the column-actuators or segment-levers, so that the carrying mechanism of the units will then carry the tens-wheel, and the carrying mechanism of the tens-wheel will then carry the hundreds-wheel, and so on through the series of wheels, bringing all the wheels to "0" position. The mechanism by which I accomplish this result is fully set forth below and will be understood from such description when considered in connection with the accompanying drawings, in which latter—

Figure 10:
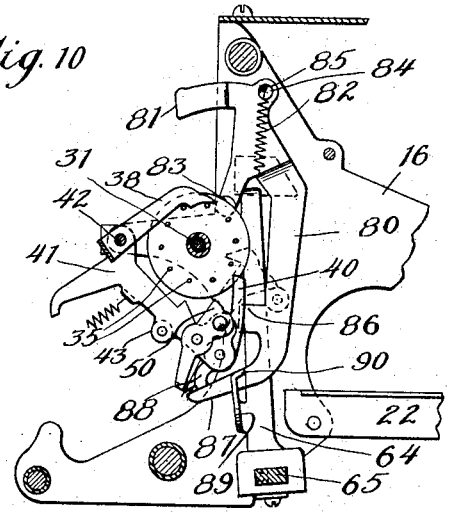
Figure 11:
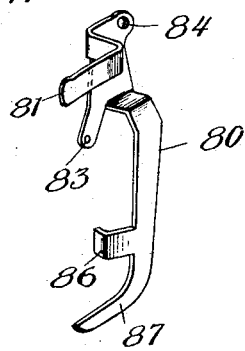
Figure 12:
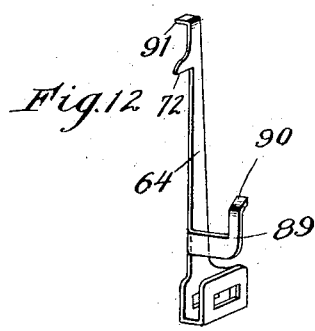
Figure 13:
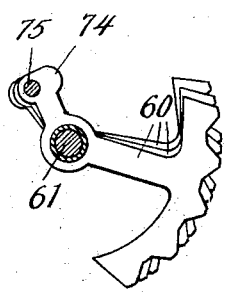

Figure 1 is a plan of the calculating-machine embodying my present improvements. Fig. 2 is a side elevation. Fig. 3 is a longitudinal vertical section. Figs. 4 and 5 are partial longitudinal vertical sections. Fig. 6 is a section on the line 6 6 of Fig. 4. Fig. 7 is a detail elevation of the numeral-wheel. Fig. 8 is a side view of the units-wheel, and Fig. 9 a similar view of the other wheels. Fig. 10 is a partial longitudinal vertical section showing some of the parts in a different position from Fig. 4. Fig. 11 is a perspective of the subtraction-lever. Fig. 12 is a like view of the stop-lever for arresting the numeral-wheels in canceling. Fig. 13 is a side elevation of a series of the canceling cam-plates, showing their relative arrangement. Figs. 14 and 15 are enlarged views similar to Figs. 4 and 5. Figs. 16 and 17 are enlarged detail views.

In said drawings, 15 represents the side frames, and 16 the division-plates between the different denominations.

17 represents the keys, of which there are nine in each denomination and which are adapted to depress the segment-levers or column-actuators 18, pivoted at 19 and provided with retracting-springs 20, one at each side of each lever, as shown at Figs. 1 to 3. The keys are returned after being operated by springs 21, secured in stationary longitudinal bars 22. Each segment-lever is arrested at the end of its downstroke by two vibrating levers 23 and 24, pivoted at the rear of the machine and arranged alongside of the segment-lever and actuating two L-shaped pivoted stop-levers 25 and 26, adapted to engage the teeth 27, formed on the edge of the segment portion of the segment-lever. The levers 23 and 24 are actuated by the keys at the proper time to throw the levers 25 and 26 into action, the lever 23 being actuated by the odd keys and the lever 24 by the even keys.

The numeral-wheels are shown at 30, the units-wheel being indicated by 30$^a$, and they are mounted side by side on the shaft 31, as seen in Fig. 1. Each wheel is provided with a pinion 32, meshing with the column-actuator made fast to an interior ratchet-wheel 33. The ratchet-wheel 33 is engaged by a pawl (not shown) carried by a disk 34 and rotates the latter in one direction, and the disk is fixedly joined to the wheel by pins 35. (See Fig. 7.) A pinion 36 is also attached to the numeral-wheel and is provided with a pin 37, projecting from it laterally, the purpose of which pinion and pin will be explained later on. 38 is a spring-pressed pawl adapted to prevent back motion and riding on the pins 35.

The carrying-pawl of one denomination is shown at 40, Fig. 10, and is supported upon a lever 41, pivoted at 42 and having a dolly-roll 43, riding upon a cam 44, having two operating-arms, each of which is adapted to lift the lever 41. The cam 44 is mounted upon a sleeve 49, surrounding a shaft 45, upon which is mounted a gear 46, Fig. 16, meshing with the gear 36 of the corresponding numeral-wheel. This gear rotating as it does with the numeral-wheel winds up a carrying-spring (not shown) on the same shaft therewith, thereby accumulating the power necessary for the operation of the carrying mechanism. The cam 44 makes a half-revolution at each operation, and its movements are controlled by an arm 48, secured to the sleeve 49, and suitable detents coacting with said arm. A locking-detent 50 is also secured to the lever 41 and engages the pins 35 of the numeral-wheel, as plainly shown at Fig. 4. The three-armed detent 51 regulates the action of the carrying-lever, and it is controlled as to position by the cam 44 and a retracting-spring 52.

At 53 is a latch pivoted at 54 and extending over and resting on the column-actuator of the denomination to which the carrying is to be done, and its purpose is to delay the operation of the carrying mechanism until said column-actuator is returned to normal position, and it is enabled to do this by engaging the projections 55 on the sleeve 49.

All the features of construction above set forth are fully explained in my said application, and I do not, therefore, go into the details thereof here.

As already stated, I aim to bring all the numeral-wheels except the units-wheel to the "8" position and the units-wheel to the "9" position, so that all the wheels are then moved by the column-actuator to the extent of a single space or number, so as to bring the units-wheel to the "0" position and the other wheels to the "9" position, and thereby enable the carrying mechanisms to complete the canceling operation. For bringing the wheels thus to the "9" and "8" positions I employ a series of notched cam-plates 60, (best shown at Figs. 2, 3, and 13,) attached to a cross-shaft 61, operated by a hand-lever located at the side of the machine. Each plate is provided with five risers or teeth, as shown, and there is one plate for each denomination, so that by attaching a dolly-roll 63 to each segment-lever in such position that the risers or cams of the corresponding plate will ride over the roll the segment-lever will be given repeated pulsations by the plate as the latter passes the roll, each riser moving the lever down and each interspace in the plate between the risers allowing the lever to return under the power of springs 20. It is intended that the hand-lever shall be moved from the position of Fig. 2 to that shown in Fig. 3 and then back to the position of Fig. 2, so that the cam-plates will thus be able to impart not less than ten impulses to the segment-levers, each impulse of the several levers carrying the corresponding wheels through a single digital space, this number being sufficient to bring the wheels to the "8" and "9" positions whatever may be their positions at the start of the canceling operation.

In order that the wheels may be arrested at the "8" and "9" positions, I employ the following devices: At 64, Fig. 2, is an upright swinging stop-lever mounted upon a cross-shaft 65, and there is one such lever for each denomination, all supported upon shaft 65. The shaft 65 is rocked from the hand-lever 62 by means of its arm 66 and the elbow-lever 67, pivoted at 68, and a dolly-roll 69, carried by the hand-lever, the elbow-lever having a surface 70 concentric with its axis 68 and a cam-slot 71, inclined downward from the end of surface 70, the lever 67 being attached at one end to the arm 66, and the surface 70 and cam-slot being at the other end thereof. When the hand-lever is in its normal position, as at Fig. 2, the roll 69 is in the cam-slot, and as soon as the lever is moved the roll leaves the slot, and in so doing it depresses the end of lever 69, on which it acts, and thereby throws the stop-lever into acting position prepared to arrest the numeral-wheel when the pin 37 of the wheel encounters the projection 72 on the stop-lever. The stop-lever now remains in this position by reason of the contact of roll 69 with surface 70 until the hand-lever completes its return stroke, and the roll 69 again enters the cam-slot, and thereby rocks the elbow-lever in the reverse direction and draws the stop-lever back to the position of Fig. 2, releasing the wheel. While the stop-lever is thus held in its acting position, the repeated pulsations or actuations of the segment-lever take place and continue until the wheel becomes locked, and when this occurs the segment-lever will also become locked by the wheel in the depressed position to which it is forced by the cam-plate, and if at such time all the teeth of the cam-plate have not passed over the roll 63 the passage of the remaining teeth will be without effect on the numeral-wheel, so that upon the release of the lock upon the wheel and segment-lever the latter will be able to actuate the wheel through a single numeral-space. This being the operation with all the wheels, it will be seen that the units-wheel will be thereby turned to "0" and that the other wheels will be turned to "9," and as the carrying mechanism of the units-wheel is thereby caused to operate it will in turn cause the operation of all the other carrying mechanisms, so that all the wheels will stand at "0."

The cam-plates are preferably attached to the shaft 61 by providing them with extensions 74, through the ends of which extensions a cross-rod 75 is passed, and applying clamping-plates 76, bearing on the shaft and the cross-rod and clamped thereon by a screw 77. The openings in the extensions 74 through which the cross-rod passes may be variously located and the relative positions of the cam-plate 60 be thereby varied as desired. My purpose in providing for different relative positions of the cam-plates is this: If all the cam-plates should actuate the segment-levers at the same instant, it would cause an unpleasant jarring and shock and considerable noise. To obviate this, I arrange the cam-plates in different positions, staggering their projections or cam-points, so that instead of all operating simultaneously a portion—say two—may operate at one instant, two more at a later instant, and so on through the series, so that the jar and noise produced is divided and produces a series of small jars and noises which are so slight as to cause no unpleasant sensation to the operator and no injury to the machine. I prefer in thus staggering the cam-plates to cause simultaneous operation of the segment-levers which are not adjacent to each other—as, for instance, the "1" and the "9" can be operated together, the "2" and the "8," the "3" and the "7, and the "4" and the "6." By the means described repeated short impulses are given to the column-actuators adapted to rapidly bring the wheels to the desired positions, and I avoid all necessity of making the numeral-wheel shaft rotatable.

At 80 is a device which I call "a subtraction-lever," because its purpose is to prevent operation of the carrying mechanism while using the machine in making subtractions, one lever being employed with each denomination. These levers are best shown at Figs. 10 and 11 and have handles or operating devices 81, projecting to the outside of the case of the machine, retracting-springs 82, pivots 83, openings 84 for the motion-limiting stop 85, right-angle projections 86, extending partially around the stop-levers 64 and serving to enable those levers to move the subtraction-levers with them when they move into locking position with the wheels, and feet or forwardly-extending projections 87, adapted when the subtraction-levers are swung toward the front of the machine to engage the depending leg 88 of the carrying-pawl 40 and throw the pawl out of action. Through this subtraction-lever it will be seen that I prevent any action of the carrying-pawl while the stop-lever is in its acting position, and consequently no carrying can take place during the part of the canceling operation which occurs while the numeral-wheels are locked. Each stop-lever 64 is also provided with a lateral projection 89, terminating in an inclined shelf 90, as seen at Fig. 12. This shelf whenever the lever is moved to its acting position encounters the foot of the carrying detaining-latch 53 of the same denomination and prevents the latch from moving down to its acting position, as it might do if not thus restrained. I thus avoid any interference with the carrying mechanism by said lever during the canceling operation.

To prevent overrotation of the numeral-wheels when actuated from the canceling cam-plates, I provide the several stop-levers with overhanging lips 91, (see Fig. 12,) which when the levers are in their acting positions are in the path of the stops 92, attached to the side of the corresponding segment-levers. The lips and stops coact in limiting the descent of the levers, so that they cannot move far enough to give the numeral-wheels more than a single numeral-space.

While I have shown what I deem to be the most desirable construction, it will be understood that I do not wish to be limited thereto in my claims, as obviously many of the features of the invention can be greatly varied without departing from the spirit of the invention.

By actuating the numeral-wheels in canceling through the medium of the column-actuators I cause the automatic release of all the locking devices such as are employed to lock the wheels normally precisely as those devices are released when the actuators are operated in adding. The canceling mechanism also automatically prevents any action on the wheels by the carrying mechanism during that portion of the canceling prior to the release of the wheels from the stop-levers by throwing the carrying-pawl out of its acting position and holding the detaining-latch from action. The canceling-lever 62 is provided with a retracting-spring 73.

I claim—

1. The calculator having numeral-wheels, a series of digital keys for each wheel and a column-actuator for each wheel, in combination with canceling mechanism other than the keys adapted to actuate the wheels by giving the actuators a plurality of impulses.

2. The combination with the numeral-wheels and the keys, of the column-actuators for said wheels, and canceling mechanism other than the keys imparting repeated impulses to said actuators.

3. The combination with the numeral-wheels and the keys, of the column-actuators for said wheels, and canceling mechanism other than the keys imparting repeated and short impulses to said actuators.

4. The combination with the numeral-wheels and the keys, of the column-actuators for said wheels, and canceling mechanism other than the keys imparting repeated single-space impulses to said actuators.

5. The calculator having in combination canceling mechanism, a series of keys for each denomination, a carrying mechanism for each denomination and a column-actuator for each denomination, said canceling mechanism giving motion to the column-actuators, and the carrying mechanisms serving to complete the canceling and the canceling mechanism being independent of the keys.

6. The calculator having a canceling mechanism other than the keys adapted to turn the wheels by repeated impulses to predetermined positions, in combination with the keys and with carrying mechanisms for completing the cancellation.

7. The calculator having a canceling mechanism other than the keys adapted to turn the units-wheel to zero and the other wheels to 9 by repeated impulses, in combination with the keys and with carrying mechanisms for completing the cancellation.

8. The calculator having a canceling mechanism adapted to turn the wheels by repeated impulses, means for arresting the wheels at predetermined positions, and carrying mechanisms for completing the cancellation.

9. The calculator having a series of numeral-wheels, a canceling mechanism adapted to turn the wheels, and means for arresting the units-wheel at 9 and the other wheels at 8, in combination with the carrying mechanisms.

10. The combination with the numeral-wheels of the keys, the column-actuators, the carrying mechanisms, and canceling mechanism other than the keys adapted to turn the wheels by repeated impulses of the actuators to positions where the canceling may be completed by the carrying mechanisms.

11. The combination with the numeral-wheels of the column-actuators, the keys, the carrying mechanisms and canceling mechanism other than the keys adapted to turn the wheels by moving the actuators so as to bring the wheels to positions allowing the completion of the canceling by the carrying mechanisms.

12. The combination with the numeral-wheels, of the column-actuators, the keys, the carrying mechanisms, and canceling mechanism other than the keys imparting impulses to the actuators, and bringing the units-wheel to zero and the others to positions where the carrying mechanisms may complete the cancellation.

13. The combination with the numeral-wheels, and the column-actuators, of the cam-plates and their actuating device acting to cause repeated impulses of the actuators.

14. The combination with the numeral-wheels and the column-actuators, of the cam-plates supported on a shaft rocked by a hand-lever, and adapted to impart repeated impulses to the actuators.

15. The combination with the numeral-wheels, of vibrating column-actuators moved in one direction by springs, canceling mechanism adapted to impart impulses to said actuators in the other direction, means for arresting the wheels at predetermined positions, and carrying mechanisms for completing the cancellation.

16. The combination with the numeral-wheels, of vibrating column-actuators moved in one direction by springs, and actuating the wheels when so moved, canceling mechanism adapted to impart impulses to said actuators in the other direction, means for arresting the wheels at predetermined positions before the return of the actuators after the last impulse has been imparted to them, and carrying mechanisms for completing the cancellation.

17. The combination with the numeral-wheels, the vibrating column-actuators turning the wheels by spring-power, canceling mechanism operating the actuators, means for arresting the wheels while under the power of the actuator-springs and at predetermined positions, and carrying mechanisms adapted to complete the cancellation after the release of the wheels.

18. The combination with the numeral-wheels, the vibrating actuators turning the wheels by spring-power, canceling mechanism operating the actuators, means for arresting the wheels at predetermined positions and while the actuators are in position to impart another actuation to the wheels as soon as they are released, and carrying mechanisms completing the cancellation.

19. The combination with the column-actuators, and the numeral-wheels, of a rock-shaft 61, a hand-lever for operating the shaft, a series of cam-plates 60 secured to the shaft, dolly-rolls on the actuators engaged by the plates, and lifting-springs for the actuators.

20. The combination with the column-actuators and the numeral-wheels, of a rock-shaft 61, a hand-lever for rocking the shaft, a series of cam-plates secured to the shaft each having a series of cam teeth or projections, dolly-rolls on the actuators engaged by the plates, and lifting-springs for the actuators.

21. The combination with the column-actuators and the numeral-wheels, of a rock-shaft 61, a hand-lever for rocking the shaft, a series of cam-plates secured to the shaft each having a series of cam teeth or projections and the teeth or projections on the plates being relatively staggered so as to reduce the noise and jar, dolly-rolls on the actuators engaged by the plates, and lifting-springs for the actuators.

22. The combination with the hand-lever for canceling, of the dolly-roll 69, the stop-lever 64 for arresting the wheels, and the intervening devices whereby the roll throws the stop-lever into and out of its acting position.

23. The combination with a hand-lever for canceling, means whereby the lever causes the turning of the wheels, and means for locking the wheels at predetermined points other than zero.

24. The combination with the numeral-wheels, the vibrating column-actuators turning the wheels by spring-power, canceling mechanism controlled by a hand-lever and operating the actuators, and means for arresting the wheels, said arresting means being set in operation by said hand-lever, and effecting the arrest before the wheels reach zero and while the actuators are under tension.

25. The combination with the numeral-wheels of spring-actuated vibrating column-actuators, canceling mechanism causing the operation of the actuators, and wheel-arresting means consisting of stop-levers 64, means for positioning said levers, and pins 37 carried by the wheels.

26. The combination with the numeral-wheels of spring-actuated vibrating column-actuators, canceling mechanism causing the operation of the actuators, and wheel-arresting means consisting of stop-levers 64, means whereby the canceling mechanism positions said levers, and pins 37 carried by the wheels.

27. The combination with the numeral-wheels, of spring-actuated vibrating column-actuators, canceling mechanism causing the operation of the actuators, wheel-arresting levers 64, a rock-shaft on which said levers are mounted, and devices whereby the canceling mechanism may rock said shaft.

28. The combination with the numeral-wheels, of spring-actuated vibrating column-actuators, canceling mechanism causing the operation of the actuators, wheel-arresting levers 64, a rock-shaft on which said levers are mounted, an elbow-lever joined to said rock-shaft at one end and having the surface 70 and cam-slot 71 at the other end and a hand-lever forming part of the canceling mechanism and having a dolly-roll working on said surface and in said slot.

29. The combination with the numeral-wheels, the column-actuators and the canceling mechanism imparting repeated impulses to the wheels, of means engaging the actuators and preventing overrotation while canceling.

30. The combination with the numeral-wheels, the column-actuators and the canceling mechanism, of means for preventing overrotation while canceling, such means consisting of the stop-levers 64 and the projections or stops 92 on the actuators engaging the levers.

31. The combination with the subtraction-lever adapted to throw the carrying-pawl out of action, and said pawl, of stop-lever 64 and its actuating devices, said levers being united so the latter may operate the former.

32. The combination with the carrying-pawl, of the stop-lever 64 and means actuated by said lever, for holding the pawl out of action.

33. The combination of the carrying mechanism, and a canceling mechanism having a stop-lever for locking the wheels, of a device for holding the pawl of the carrying mechanism out of action, said device being controlled automatically by said stop-lever.

34. The combination with the detaining-latch 53 of the carrying mechanism, of the stop-lever having a projection or shelf engaging the latch, and whereby it automatically holds the latch out of action.

DORR E. FELT.

Witnesses:
H. M. MUNDAY,
EDW. S. EVARTS.